United States Patent
Tanaka (10) Patent No.: US 7,432,979 B2
(45) Date of Patent: Oct. 7, 2008

(54) INTERLACED TO PROGRESSIVE SCAN IMAGE CONVERSION

(75) Inventor: Tetsuro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 10/932,622

(22) Filed: Sep. 2, 2004

(65) Prior Publication Data
US 2005/0195325 A1 Sep. 8, 2005

(30) Foreign Application Priority Data
Sep. 3, 2003 (JP) .............................. 2003-311627

(51) Int. Cl.
H04N 7/01 (2006.01)
H04N 11/20 (2006.01)
H04N 5/14 (2006.01)
H04N 9/64 (2006.01)

(52) U.S. Cl. ........................ 348/448; 348/441; 348/452; 348/700; 348/701

(58) Field of Classification Search .................. 348/448, 348/452, 441, 700, 701
See application file for complete search history.

(56) References Cited

U.S. PATENT DOCUMENTS

| 5,642,170 | A | * | 6/1997 | Hackett et al. | 348/459 |
| 5,661,525 | A | * | 8/1997 | Kovacevic et al. | 348/452 |
| 5,943,099 | A | * | 8/1999 | Kim | 348/448 |
| 6,041,142 | A | * | 3/2000 | Rao et al. | 382/232 |
| 6,381,279 | B1 | * | 4/2002 | Taubman | 375/240.18 |
| 6,563,550 | B1 | * | 5/2003 | Kahn et al. | 348/700 |
| 6,625,333 | B1 | * | 9/2003 | Wang et al. | 382/300 |
| 6,731,799 | B1 | * | 5/2004 | Sun et al. | 382/173 |
| 6,754,371 | B1 | * | 6/2004 | Kondo et al. | 382/107 |
| 6,839,089 | B2 | * | 1/2005 | Fakhruddin | 348/459 |
| 6,980,254 | B1 | * | 12/2005 | Nishihashi et al. | 348/452 |
| 7,039,254 | B1 | * | 5/2006 | Maenaka et al. | 382/300 |
| 7,098,958 | B2 | * | 8/2006 | Wredenhagen et al. | 348/452 |
| 7,129,989 | B2 | * | 10/2006 | Chen et al. | 348/448 |
| 7,170,562 | B2 | * | 1/2007 | Yoo et al. | 348/452 |
| 2003/0133501 | A1 | * | 7/2003 | Ueda et al. | 375/240.13 |

* cited by examiner

Primary Examiner—Brian P. Yenke
(74) Attorney, Agent, or Firm—Frommer Lawrence & Haug LLP; William S. Frommer (57) ABSTRACT

An image processing apparatus that can convert an interlaced signal generated by the 3-2 or 2-2 pull-down process, to a progressive signal without degrading the quality of the image represented by the interlaced signal, even if the interlaced signal contains an ordinary 60-fields/sec signal. The apparatus has a progressive conversion unit 11. The progressive conversion unit 11 generates an intra-field interpolated signal and an a motion-adaptive interpolated signal to convert an interlaced signal generated by the 3-2 or 2-2 pull-down process and containing an ordinary 60-fields/sec signal, to a progressive signal. The unit 11 then determines, for each pixel, whether the intra-field interpolated signal contains a double-image error. If a double-image error is detected, the unit 11 replaces, for each pixel, the intra-field interpolated signal by the motion-adaptive interpolated signal.

23 Claims, 9 Drawing Sheets

FIG. 1A   FIG. 1B   FIG. 1C

PRIOR ART

FIG. 2

PRIOR ART

FIG.3

PRIOR ART

FIG.4

PRIOR ART

|   | DOUBLE-IMAGE | | DOUBLE-IMAGE | | |
|---|---|---|---|---|---|
| A | 1 | 1 | 0 | 1 | 1 |
| B | 0 | 1 | 1 | 1 | 1 |
| C | 1 | 1 | 0 | 1 | 0 |
| D | 0 | 0 | 1 | 1 | 0 |
| E | 1 | 1 | 0 | 1 | 1 |

FIG. 1 1

INTERLACED TO PROGRESSIVE SCAN IMAGE CONVERSION

BACKGROUND OF THE INVENTION

1. Field of the Invention

The present invention relates to an image processing apparatus and an image processing method, both designed to convert a signal to a progressive signal the signal composed of an interlaced signal generated by the 3-2 pull-down process or the 2-2 pull-down process and an ordinary signal interlaced at the rate of, for example, 60 fields/sec.

This application cams priority of Japanese Patent Application No. 2003-311627, filed on Sep. 3, 2003, the entirety of which is incorporated by reference herein.

2. Description of the Related Art

Figure 1A:
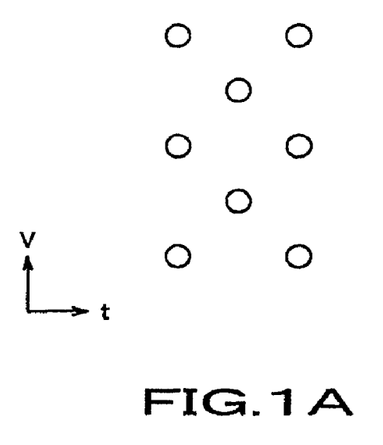
FIG. 1A is a diagram showing scanning lines for an interlaced signal.
Figure 1B:
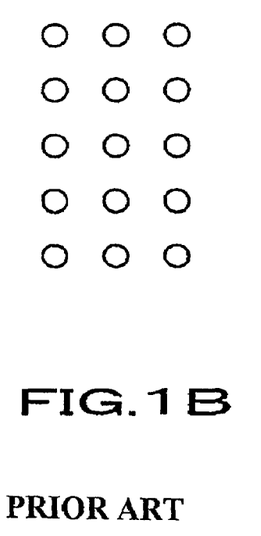
FIG. 1B is a diagram depicting scanning lines for a progressive signal.
Figure 1C:
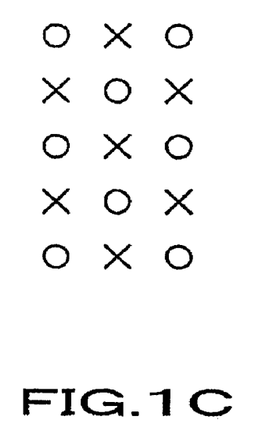
FIG. 1C is a diagram showing scanning lines for a progressive signal that has been generated by performing scanning-line interpolation on an interlaced signal.

Standard television signals, such as NTSC signals and high-definition signals, are interlaced signals. FIG. 1A shows the scanning lines for an interlaced signal. FIG. 1B depicts the scanning lines for a progressive signal. FIG. 1C shows a progressive signal obtained by converting an interlaced signal through scanning-line interpolation. In FIGS. 1A, 1B and 1C, "o" indicates a scanning line and "x" indicates a scanning line interpolted.

In FIGS. 1A, 1B and 1C, arrow V represents the vertical direction, while arrow t represents the time axis. As illustrated in FIG. 1A, each frame of the interlaced signal consists of two fields that are dislocated from each other in the time axis and the vertical direction. By contrast, the progressive signal is free of field dislocation as seen from FIG. 1B. The interlaced signal may have an interlace disturbance, such as line flicker, if it has a frequency component that is prominent in the vertical direction of image. The progressive signal does not have an interlace disturbance.

There is a method of eliminating the interlace disturbance. In the method, any scanning line extracted in the interlace process is interpolated by the surrounding scanning lines, as is illustrated in FIG. 1C. This method is known as "progressive transform" or "double-density transform."

Figure 2:
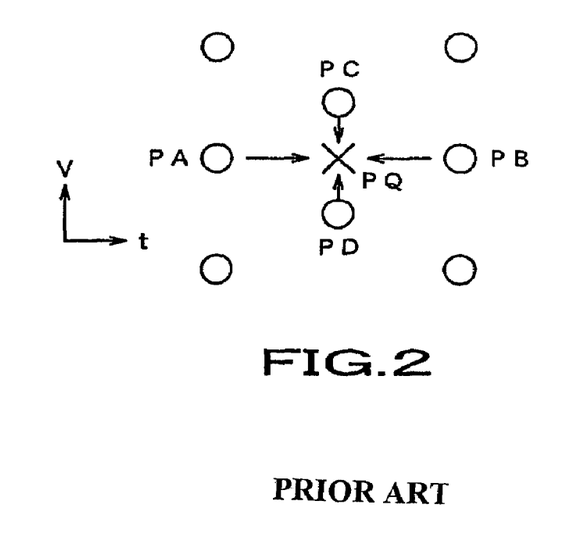
FIG. 2 is a diagram explaining the inter-field interpolation and the intra-field interpolation.

The scanning-line interpolation performed in the progressive transform is motion-adaptive interpolation. That is, as shown in FIG. 2, the inter-field interpolation is carried out, generating a new scanning line. More precisely, for a still picture, an average value of signals PA and PB representing two field pixels adjacent in the horizontal direction is obtained, generating a signal PQ that resets a new pixel x. For a moving picture, on the other hand, the intra-field interpolation is carried out, generating a new scanning line. An average value of signals PC and PD representing two field pixels adjacent in the vertical direction is obtained, generating the signal PQ that represents the new pixel x. If the image is a still picture, the progressive transform can provide an image that has little folding distortion and high resolution. If the image is a moving picture, however, the progressive transform results in an image that has a conspicuous folding distortion and very low resolution.

Figure 3:
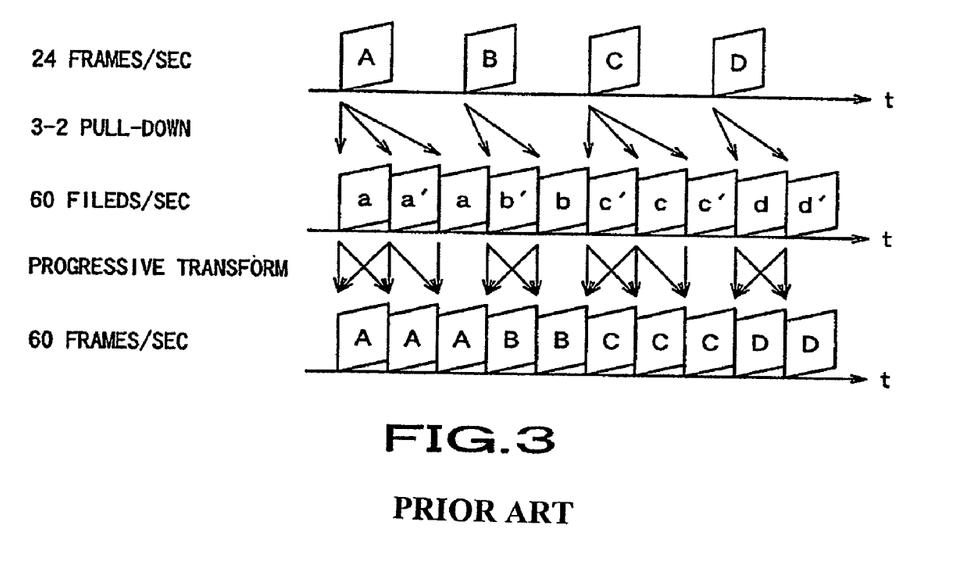
FIG. 3 is a diagram illustrating the 3-2 pull-down process.
Figure 4:
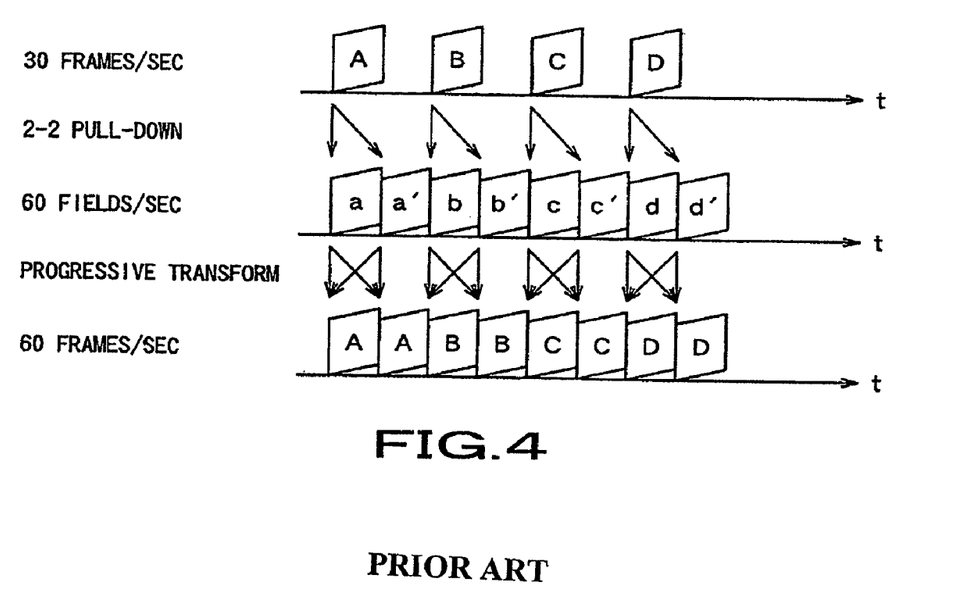
FIG. 4 is a diagram illustrating the 2-2 pull-down process.

Assume that the input signal that should be subjected to the progressive transform may be an interlaced signal generated by the 3-2 pull-down process or the 2-2 pull-down process. Then, a method other than the motion-adaptive interpolation may be used. In this case, the progressive transform can provide a high-quality image even if the image moves. Note that the 3-2 pull-down process is a frame-rate conversion shown in FIG. 3. This process is used as a method of converting progressive signals A, B, C, . . . , such as 24-frames/sec film data, to interlaced signals a, a', a, b', b, c', c, c', . . . of 60-fields/sec, NTSC scheme. In FIG. 3, the prime (') shows whether the signal pertains to an even-numbered field or an odd-numbered field. Also note at the 2-2 pull-down process is such a frame-rate conversion as illustrated in FIG. 4. The 2-2 pull-down process is employed as a method of converting progressive signals A, B, C, . . . , such as 30 frames/sec film data, to interlaced signals a, a', b, b', c, c', . . . of 60-fields/sec, NTSC scheme.

As seen from FIG. 3, the original image, i.e., one-frame image, is divided into two or three fields in the 3-2 pull-down process. As can be understood from FIG. 4, the original image, i.e., one me image, is divided into two fields in the 2-2 pull-down process. Thus, if the 3-2 or 2-2 pattern of the input signal acquired by the 3-2 or 2-2 pull-down process is known, the input signal can be converted to a progressive signal in the 3-2 or 2-2 pull-down process, by performing intra-field interpolation on only the adjacent fields generated from one and the same frame. This can be accomplished no matter whether the image is a still picture or a moving picture. The intra-field interpolation is a process that is different from the inter-field interpolation shown in FIG. 2. Nonetheless, it is similar in that the signal PA for the preceding field or the signal PB for the following field is used as signal PQ that represents a new pixel, thereby to generate a new scanning line. The intra-field interpolation can, therefore, provide images that have little folding distortion and high resolution.

Figure 5:
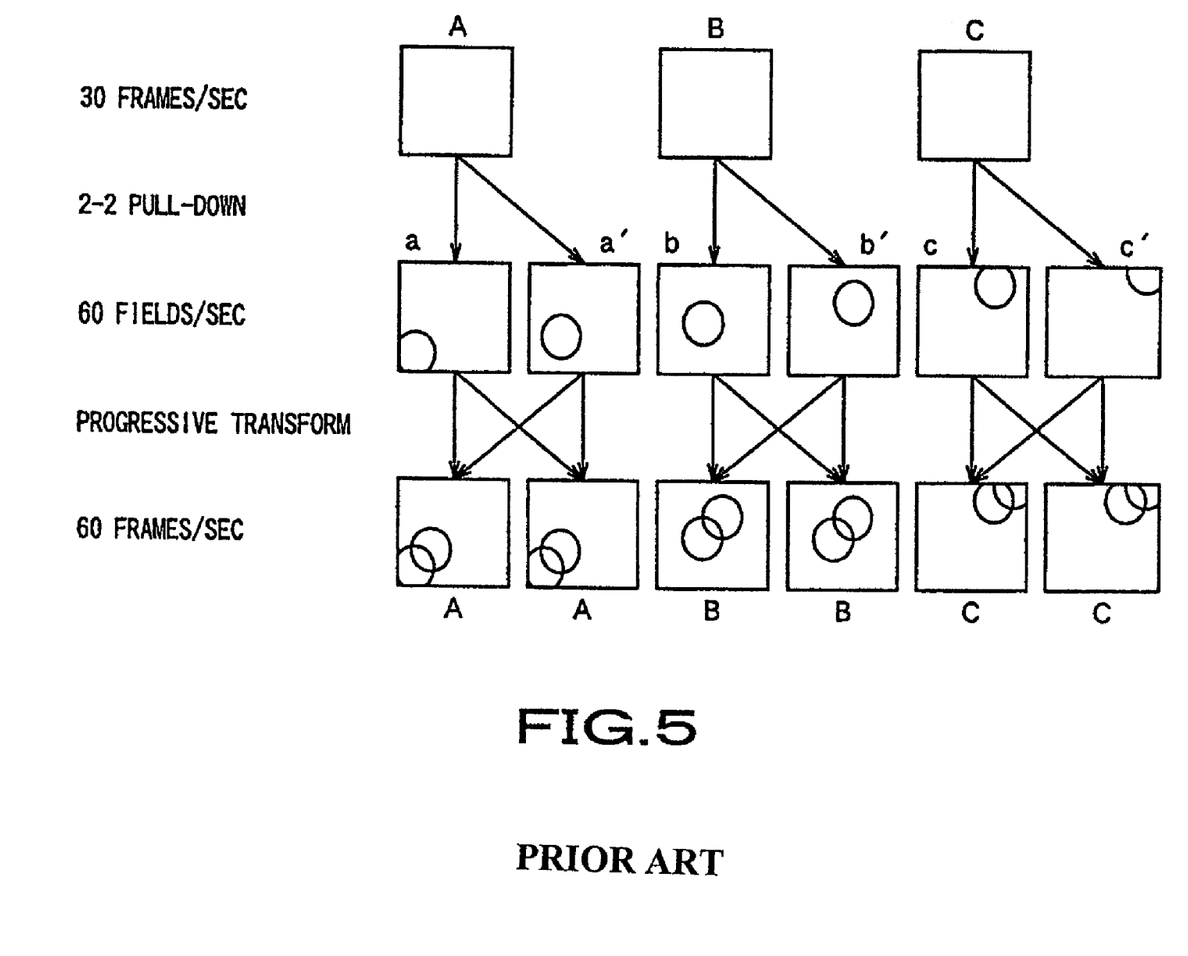
FIG. 5 is a diagram explaining the problem with a process of converting an input signal to a progressive signal, which arises when the input signal is an interlaced signal generated by the 2-2 pull-down process and contains a 60-fields/sec image.

An ordinary 60-fields/sec signal may be inserted by edition into an interlaced signal generated by the 3-2 pull-down process or 2-2 pull-down process. Such an interlaced signal tat contains a 60-fields/sec signal to a progressive signal cannot be converted to an optimal progressive signal by means of intra-field interpolation. This is inevitable because in the ordinary 60-fields/sec signal no field generated from an image exists between two adjacent fields generated from the same image, particularly when the ordinary 60-fields/sec signal represents a moving picture. Consequently, this interlaced signal represents, but a low-quality image. Assume that an interlaced signal obtained by the 2-2 pull-down process and containing a 60-fields/sec signal representing a round object is converted to a progressive signal, as is illustrated in FIG. 5. Also assume that the intra-field interpolation has been performed in the 2-2 pull-down process. Then, the resultant image will include two identical images of the round object, which overlap each other, simply because the ordinary 60-fields/sec signal represents a moving picture of the round object. Obviously, the image is much degraded in quality.

This problem may be solved by the technique disclosed in Japanese Patent Application Laid-Open Publication No. 2000-78535. This technique is to convert a signal into a desirable progressive signal even if the signal consists of an interlaced signal obtained by the 3-2 or 2-2 pull-down process and an ordinary 60-fields/sec signal, without degrading the quality of image. In the technique, one of three signals, which has the smallest absolute value is selected and used as a motion signal K. The three signals are: (i) a succeeding intra-field interpolated signal that is a scanning-line signal identical with the interpolated scanning line for the field succeeding the field of interest in time; (ii) a preceding intra-field interpolated signal that is a scanning-line signal identical with the interpolated scanning line for the field preceding the field of interest in time; and (iii) an inter-frame matching signal that represents the absolute value of the difference between the succeeding intra-field interpolated signal and the preceding intra-field interpolated signal. The motion signal K is applied to obtain an optimal signal. More specifically, the mixing ratio between an intra-field interpolated signal and an intra-field interpolated signal for the field of interest is changed in accordance with the motion signal K. The "intra-field interpolated signal" is composed of the succeeding intra-field interpolated signal and the preceding intra-field interpolated signal. The "intra-field interpolated signal for the field of interest" has been generated by adding the two scanning lines above and below the interpolated scanning line for the field of interest, respectively.

In the technique disclosed in Japanese Patent Application Laid-Open Publication No. 2000-78535, the pixel data items of different fields, i.e., pixel data items acquired at different times, are compared. Any pixel data item pertaining to a moving image inserted therefore changes in value with time. Hence, the intra-field interpolation is predominant. In consequence, any image part other than the inserted image part which can be converted into a desirable progressive signal without degrading the image quality, will inevitably be degraded in quality.

SUMMARY OF THE INVENTION

The present invention has been made in view of the foregoing. An object of the invention is to provide an image processing apparatus and an image processing method that can convert an interlaced signal generated by the 3-2 pull-down process, the 2-2 pull-down process, or the like, to a progressive signal without degrading the quality of the image represented by the interlaced signal, even if the interlaced signal contains an ordinary 60-fields/sec signal. In other words, the apparatus and method can convert both the 60-fields/sec signal and the rest of the interpolated signal to a progressive signal, without degrading the image quality. Note that the interlaced signal has its frame rate adjusted by re-arranging the original-image frames (e.g., frames of film) in a prescribed sequence.

To achieve the object, an image processing apparatus according to this invention is designed to convert an interlaced signal to a progressive signal, the interlaced signal containing a signal converted to have the same frame rate as an image signal that consists of original-image frames arranged in a prescribed sequence. The apparatus comprises: a signal-generating means for performing intra-field interpolation to generate a progressive, intra-field interpolated signal from a scanning line that follows the present field in time and is located at the same position as the interpolated scanning line of the present field, or from a scanning line preceding the present field in time and is located at the same position as the interpolated scanning line of the present field; and a double-image detecting means for determining, for each pixel, whether the pixel of interest, which is contained in the intra-field interpolated signal, is one of pixels that constitute the double image part of the intra-field interpolated signal.

In this image processing apparatus, when the double-image detecting means determines that the pixel of interest constitutes the double-image part, the intra-field interpolated signal generated by the signal-generating means and corresponding to the pixel of interest is replaced by a predetermined converted signal that corresponds to the pixel of interest.

The image processing apparatus may further comprise an interpolated-signal generating means for performing intra-field interpolation to generate a progressive, interpolated signal from scanning lines located above and below the interpolated scanning line in the present field, or performing inter-field interpolation to generate the signal from a scaling line that follows the present field in time and is located at the same position as the interpolated scanning line of the present field, and a scanning line preceding the present field in time and is located at the same position as the interpolated scanning line of the present field. In this case, when the double detecting means determines that the pixel of interest constitutes the double-image part, the pixel of interest, contained in the intra-field interpolated signal, is replaced by a pixel in the interpolated signal and assuming the same position as the pixel of interest.

To attain the object specified above, an image processing method according to this invention is designed to convert an interlaced signal to a progressive signal, the interlaced signal containing a signal converted to have the same fame rate as an image signal that consists of original-image frames arranged in a prescribed sequence. The method comprises: a step of performing intra-field interpolation to generate a progressive, intra-field interpolated signal from a scanning line that follows the present field in time and is located at the same position as the interpolated scanning line of the present field, or from a scanning line preceding the present field in time and is located at the same position as the interpolated scanning line of the present field, and a double-image detecting step of determining, for each pixel whether the pixel of interest which is contained in the intra-field interpolated signal, is one of pixels that constitute the double-image part of the intra-field interpolated signal.

In the image processing method, the intra-field interpolated signal generated in the step of performing intra-field interpolation and corresponding to the pixel of interest may be replaced by a predetermined converted signal responding to the pixel of interest when it is determined, in the double-image detecting step, that the pixel of interest constitutes the double-image part.

The image processing method may further comprise a step of generating a progressive, interpolated signal by performing intra-field interpolation from scanning lines located above and below the interpolated scanning line in the present field, or by performing inter-field interpolation from a scanning line that follows the present field in time and is located at the same position as the interpolated scanning line of the present field, and a scanning line preceding the present field in time and is located at the same position as the interpolated scanning line of the present field. In this case, when it is determined, in the double-image detecting step, that the pixel of interest constitutes the double-image part the pixel of interest contained in the intra-field interpolated signal is replaced by a pixel contained in the interpolated signal and assuming the same position as the pixel of interest.

In the image processing apparatus and method described above, a double image, if any in an intra-field interpolated signal, is detected for each pixel in order to convert the interlaced signal generated by the 3-2 pull-down process, the 2-2 pull-down process, or the like, and containing an ordinary 60-fields/sec interlaced signal, to a progressive intra-field interpolated signal by means of intra-field interpolation. If a double-image is detected, the pixel constituting the double image is replaced by the corresponding pixel contained in another signal generated by means of, for example, motions-adaptive interpolation.

The image processing apparatus and method according to the present invention can perform intra-field interpolation thereby converting a mixed signal consisting of an interlaced signal generated by the 3-2 pull-down process, the 2-2 pull-down process, or the like and an ordinary 60-fields/sec interlaced signal to a progressive intra-field interpolated signal. The apparatus and method can reliably distinguish, for each pixel, the interlaced signal and the ordinary 60-fields/sec interlaced signal from each other. If the intra-field interpolated signal contains a double-image park any pixel that constitutes the double-image part is replaced by the corresponding pixel contained in another signal generated by means of, for example, motions-adaptive interpolation. Thus, both the interlaced signal and the ordinary 60-fields/sec interlaced signal can be converted to a progressive signal, without degrading the quality of image.

BRIEF DESCRIPTION OF THE DRAWINGS

These and other objects and features of the present invention will become clear from the following description of the preferred embodiments given with reference to the accompanying drawings, in which.

DETAILED DESCRIPTION OF THE PREFERRED EMBODIMENTS

An embodiment of the present invention will be described in detail, with reference to the accompanying drawings. This embodiment is an image processing apparatus and an image processing method. The apparatus and method can convert an interlaced signal to a progressive signal without degrading the image quality, even if the interlaced signal has been generated by the 3-2 pull-down process or the 2-2 pull-down process and contains an ordinary 60-fields/sec signal. In other words, the apparatus and method can convert both the 60-fields/sec signal and the rest of the interlaced signal to a desirable progressive signal.

Figure 6:
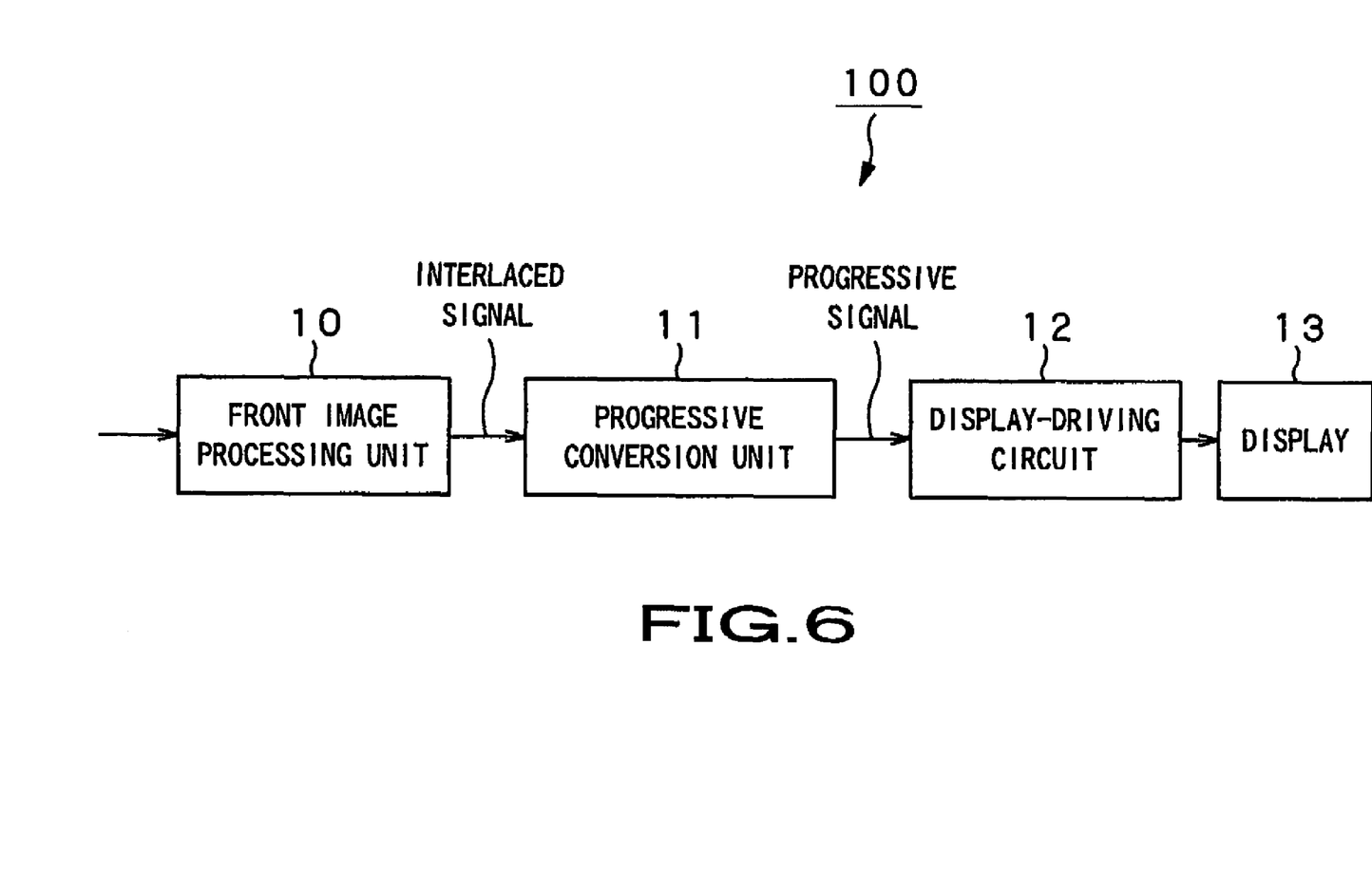
FIG. 6 is a block diagram showing the schematic configuration of an image processing apparatus according to this invention.

The image processing apparatus 100 according to this embodiment is configured as shown in FIG. 6. As FIG. 6 shows, the apparatus 100 comprises a front image processing unit 10, a progressive conversion unit 11, a display-driving circuit 12, and a display 13.

The front image processing unit 10 receives an image signal from various signal sources. The image signal is, for example, an NTSC signal a PAL signal an HDTV signal from a BS digital tuner, or the like. In terms of signal format, the image signal is an interlaced signal such as a 525i (525-line) signal, a 625i signal or an 1125i signal.

The progressive conversion unit 11 is designed to convert a 525i signal to a 525p signal (i.e., a 525-line progressive signal), a 625i signal to a 625p signal, and a 1125i signal to a 1125p signal. The unit 11 can convert an interlaced signal to a progressive signal, without degrading the image quality, even if the interlaced signal has been generated by the 3-2 or 2-2 pull-down process and contains an ordinary 60-fields/sec signal. That is, the unit 11 can convert both the 60-fields/sec signal and the remaining part of the interlaced signal, causing no image-quality degradation. The progressive conversion unit 11 supplies the progressive signal, thus obtained, to display diving circuit 12.

The display-driving circuit 12 drives the display 13. Driven by the display-driving circuit 12, the display 13 displays the image represented by the progressive signal supplied from the progressive conversion unit 11. The display 13 can be selected from various types of displays such as a cathode-ray tube, a liquid crystal display and a plasma display.

The display-driving circuit 12 may include a resolution-converting circuit that converts a standard- or low-resolution image to a high-resolution image containing a high-band component that is not contained in the standard- or low-resolution image. Such a resolution-converting circuit is disclosed in, for example, Japanese Patent Application Laid-Open Publication Nos. 7-193789 and 11-55630.

Figure 7:
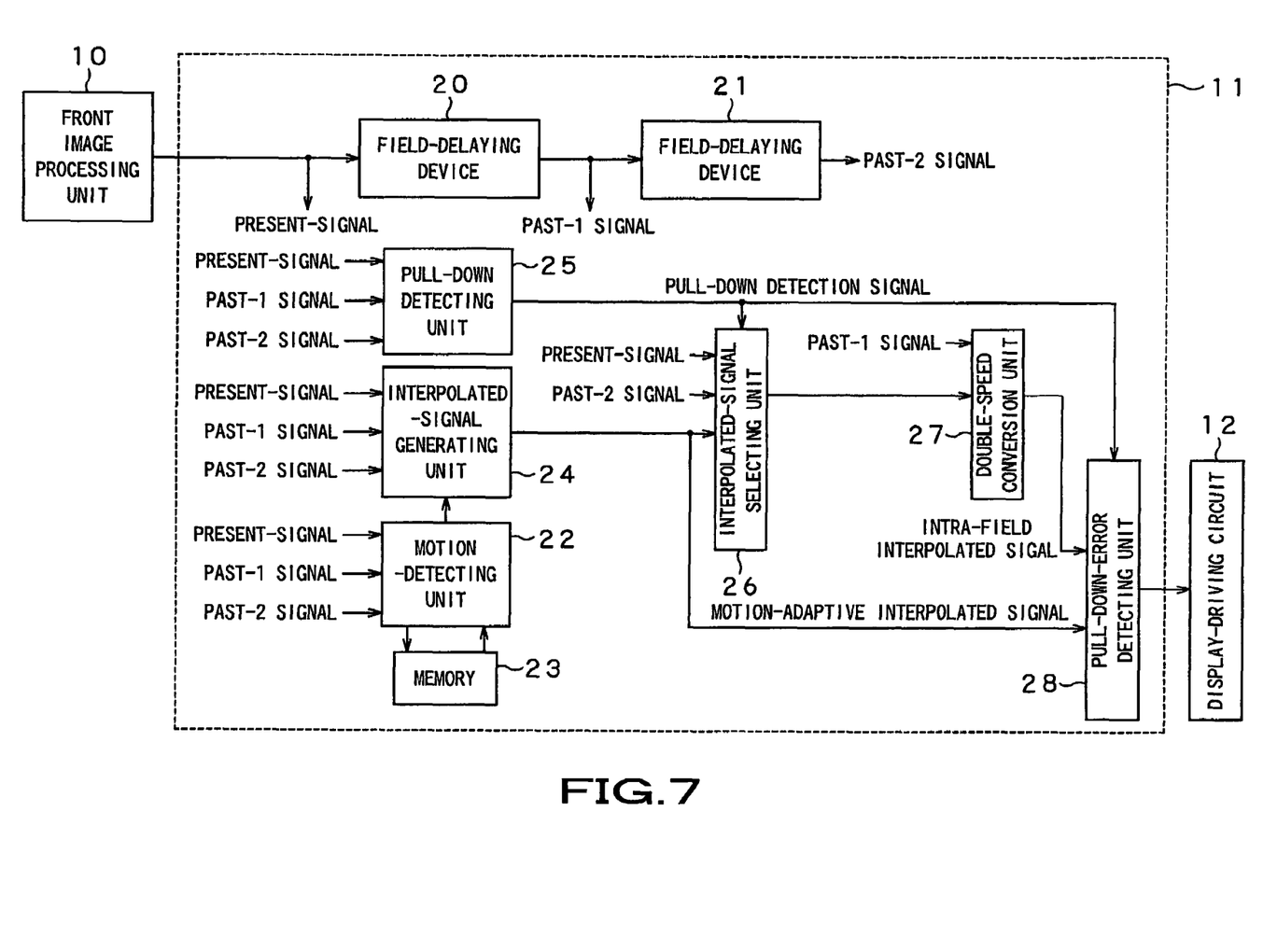
FIG. 7 is a block diagram illustrating an internal structure of a progressive conversion unit that may be incorporated in the image processing apparatus shown in FIG. 6.

The progressive conversion unit 11 may have the structure illustrated in FIG. 7. As shown in FIG. 7, the interlaced signal supplied from the front image processing unit 10 is input, as a present signal, to some components of the progressive conversion unit 11. The progressive conversion unit 11 has field-delaying devices 20 and 21. The field-delaying device 20 delays the present signal by one field time, thus converting the present signal to a past-1 signal. The past-1 signal is supplied to the field-delaying device 21. This field-delaying device 21 delays the past-1 signal by one field time, generating a past-2 signal.

The progressive conversion unit 11 further has a motion-detecting unit 22, a memory 23, an interpolated-signal generating unit 24 of motion-adaptive type, a pull-down detecting unit 25, an interpolated-signal selecting unit 26, a double-speed conversion unit 27, and a pull-down-error detecting unit 28. The motion-detecting unit 22 compares the past-1 signal with the past-2 signal, detecting a motion if any. That is, the unit 22 uses the history of motion, which is stored in the memory 23 and which indicates whether the pixel of interest has moved or not. The motion-detecting unit 22 supplies the result of motion detection to the interpolated-signal generating unit 24. In accordance with the result of motion detection, the interpolated-signal generating unit 24 performs inter-field interpolation or intra-field interpolation, generating a progressive, motion-adaptive interpolated signal. To be more specific, if the image remains still, not moving at all, the unit 24 caries out inter-field interpolation in which a new pixel is generated from the average value of any two pixels adjacent in the horizontal direction, thereby generating a new scanning line. If the image is moving, the unit 24 performs intra-field interpolation in which a new pixel is generated from the average value of any two pixels adjacent in the vertical direction, generating a new scanning line. Thus, the interpolated-signal generating unit 24 generates a motion adaptive interpolated signal, which is supplied to the interpolated-signal selecting unit 26 and the pull-down-error detecting unit 28.

The pull-down detecting unit 25 detects a 3-2 pull-down process or a 2-2 pull-down process from the present signal, past-1 signal and past-2 signal. More precisely, if the input signal is a signal that has been interlaced by the 3-2 pull-down process or the 2-2 pull-down process, a field adjacent to any field must be one that has been generated from the same frame of image. Hence, the unit 25 can detect either the 3-2 pull-down process or the 2-2 pull-down process, by determining whether the fields have moved with resect to one another. In other words, the unit 25 correlates the fields, thus detecting a sequence of fields. The signal interlaced by means of the 3-2 or 2-2 pull-down process may contain an ordinary signal. Such an interlaced signal can be used, only if it is determined whether the signal has a value equal or greater than a preset threshold value and it is thereby determined whether the fields are correlated. The pull-down detecting unit 25 generates a pull-down detection signal that represents the result of detecting the pull-down process. This signal is supplied to the interpolated-signal selecting unit 26 and the pull-down-error detecting unit 28.

The interpolated-signal selecting unit 26 determines which kind of an interpolated signal should be supplied to the double-speed conversion unit 27, from the motion-adaptive interpolated signal, the present signal, the past-2 signal and the pull-down detection signal. The input signal may be one that has been interlaced by the 3-2 pull-down process or 2-2 pull-down process. In this case, there must be an adjacent field that has been generated from the same frame of image. Therefore, the interpolated-signal selecting unit 26 selects and supplies the signal representing this adjacent field (i.e., the present signal or the past-2 signal), as an interpolated signal, to the double-speed conversion unit 27. The input may not be one that has been interlaced by the 3-2 pull-down process or 2-2 pull-down process. If this is the case, the unit 26 selects and supplies the signal representing the output signal of the interpolated-signal generating unit 24, as an interpolated signal, to the double-speed conversion unit 27. The double-speed conversion unit 27 alternately reads the interpolated signal and the past-1 signal at a rate twice as high as the speed of reading the input signal, thus generating a progressive intra-field interpolated signal. The progressive intra-field interpolated signal is supplied to the pull-down-error detecting unit 28.

Note that the conventional progressive conversion unit supplies an intra-field interpolated signal to a display-driving circuit, without processing the intra-field interpolated signal at all. The image signal input to the conventional progressive conversion unit may be an interlaced signal that has been generated by the 3-2 or 2-2 pull-down process and that contains a 60-fields/sec signal. If so, the 60-fields/sec signal will inevitably resent two identical images that overlap each other. This would greatly degrade the image quality.

To avoid this, the progressive conversion unit 11 shown in FIG. 7 has the pull-down-error detecting unit 28 that is connected to the output of the double-speed conversion unit 27. The pull-down-error detecting unit 28 evaluates the progressive intra-field interpolated signal input to it. If the unit 28 detects a double-image error, it replaces the intra-field interpolated signal with a motion-adaptive interpolated signal. The unit 28 evaluates the intra-field interpolated signal, for every pixel, in order to detect errors made in the pull-down process. Hence, upon detecting a double-image error, the pull-down-error detecting unit 28 replaces the intra-field interpolated signal with a motion-adaptive interpolated signal in units of pixels. A double image is detected if the pull-down detecting unit 25 determines that the input signal is a signal interlaced by the 3-2 or 2-2 pull-down process and if the interpolated-signal selecting unit 26 uses the present signal or the past-2 signal as a pixel that is to be interpolated.

Figure 8:
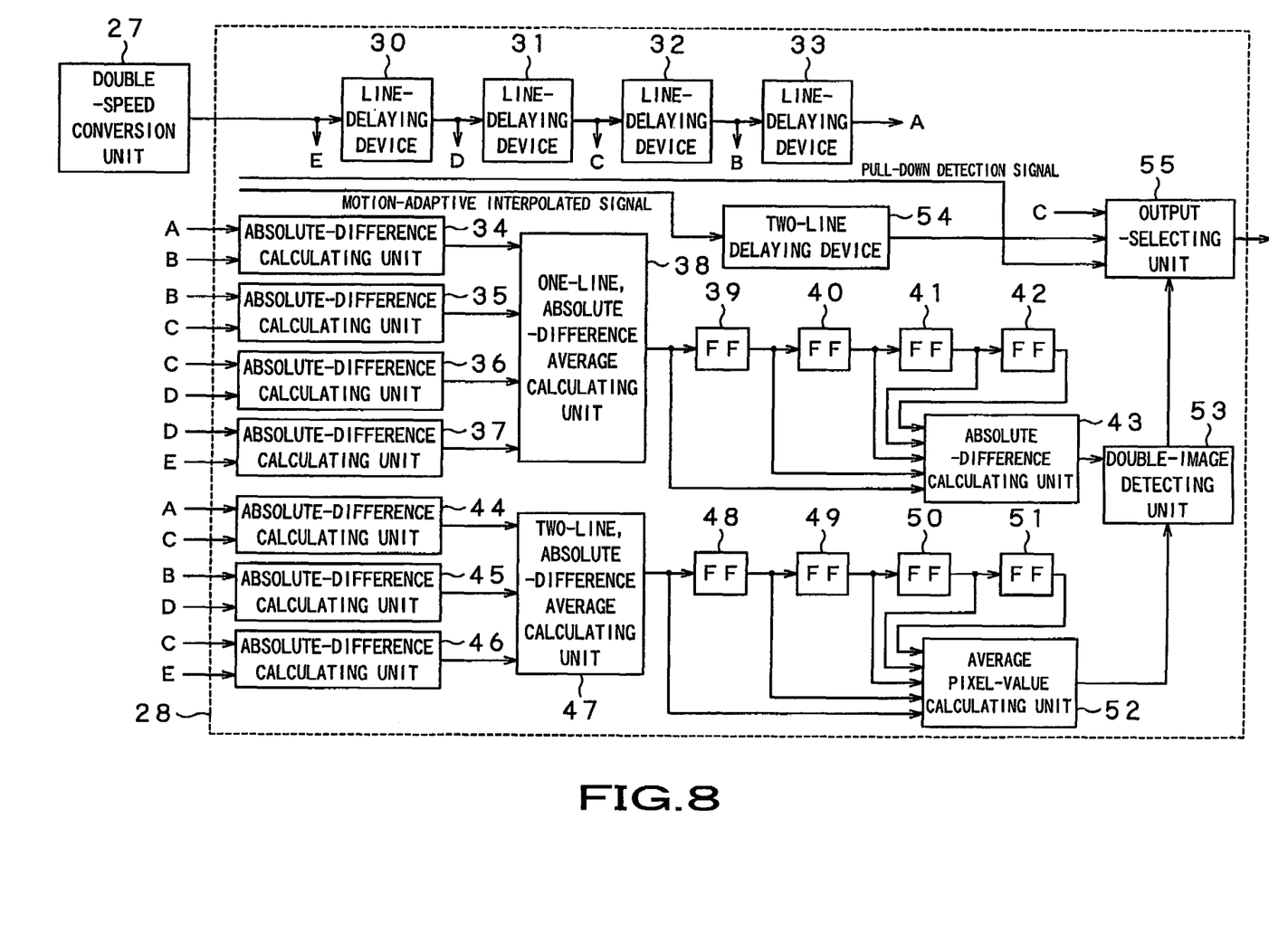
FIG. 8 is a block diagram depicting the internal structure of the pull-down-error detecting unit provided in the progressive conversion unit of FIG. 7.
Figure 9:
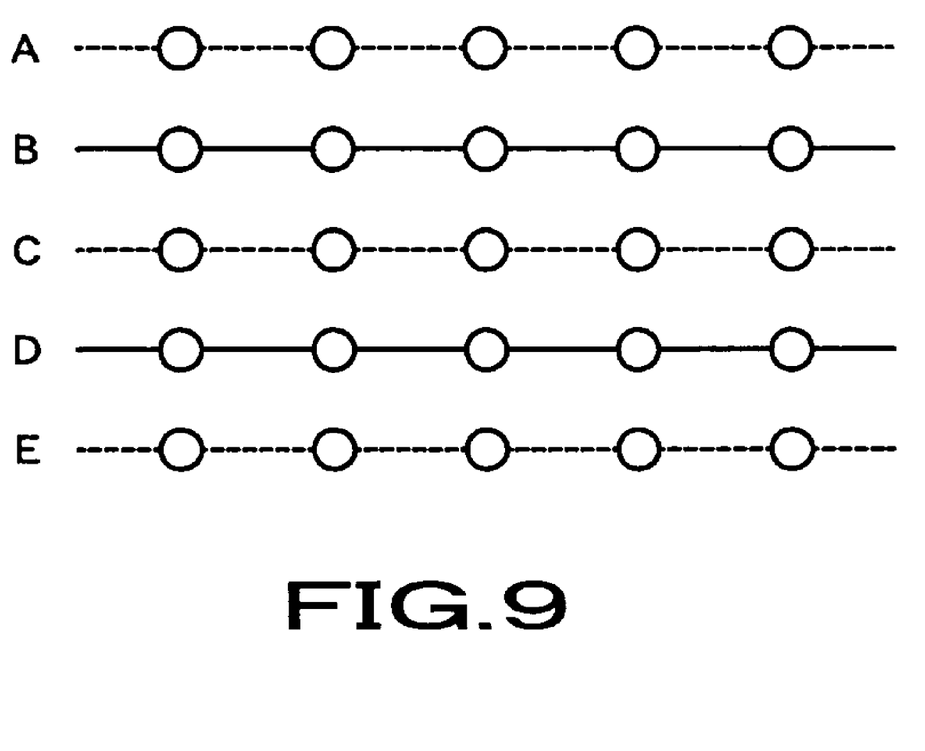
FIG. 9 is a diagram showing the positions of various line-delayed signals.

The pull-down-error detecting unit 28 may be configured as is illustrated in FIG. 8. The pull-down-error detecting unit 28 receives a filed-interpolated signal supplied from the doubles conversion unit 27. In the unit 28, a line-delaying device 30 delays the field interpolated signal by one-line time. The field-interpolated signal is further delayed by three other line-delaying devices 31, 32 and 33, by one-line time in each of these line-delaying devices. As a result, signals A, B, C and D are output from the line-delaying devices 33, 32, 31 and 30, restively. The signal supplied from the double-speed conversion unit 27 is used as signal E. These signals A to E have the position relation depicted in FIG. 9. In FIG. 9, the broken lines indicate scanning lines that have been generated by means of intra-field interpolation, and the solid lines indicate the scanning lines for the signal input to the pull-down-error detecting unit 28.

For any interlaced signal generated by the 3-2 or 2-2 pull-down process, the lines that lie adjacent to one another in the horizontal direction pertain to the same frame of image. These lines must therefore be greatly correlated. For any 60-fields/sec signal, the lines that lie adjacent to one another in the vertical direction (i.e., lines pertaining to a progressive field-interpolated signal) must be much correlated. Utilizing this fact, the pull-down-error detecting unit 28 (FIG. 8) distinguishes a signal interlaced by the 3-2 or 2-2 pull-down process from a 60-fields/sec signal.

As FIG. 8 shows, the pull-down-error detecting unit 28 has absolute-difference calculating units 34 to 37, a one-line, absolute difference average calculating unit 38, flip-flop (FF) circuits 39 to 42, an average pixel-value calculating unit 43, and a double-image detecting unit 53. Each of the absolute-difference calculating units 34 to 37 is configured to find the absolute difference between the pixel data items for two adjacent lines. More correctly, the absolute-difference calculating unit 34 calculates the absolute difference between signals A and B. The absolute-difference calculating unit 35 calculates the absolute difference between signals B and C. The absolute-difference calculating unit 36 calculates the absolute difference between signals C and D. The absolute-difference calculating unit 37 calculates the absolute difference between signals D and E. The one-line, absolute-difference average calculating unit 38 finds the average of the absolute differences the calculating units 34 to 37 have calculated. The average value found by the unit 38 is supplied to the FF circuit 39. The FF circuits 39 to 42 supply the average value of the absolute differences for five adjacent pixels, to the average pixel-value calculating unit 43. The unit 43 finds the average value for five adjacent pixels. The average value calculated by the unit 43 is supplied to the double-image detecting unit 53.

As FIG. 8 shows, too, the pull-down-error detecting unit 28 has absolute-difference calculating units 44 to 46, a two-line, absolute-difference average calculating unit 47, flip-flop (FF) circuits 48 to 51, an average pixel-value calculating unit 52. Each of the absolute difference calculating units 44 to 46 is configured to find the absolute difference between the pixel data items for one line and the line following the next. More correctly, the absolute-difference calculating unit 44 calculates the absolute difference between signals A and C. The absolute-difference calculating unit 45 calculates the absolute-difference between signals B and D. The absolute-difference calculating unit 46 calculates the absolute difference between signals C and E. The two-line, absolute-difference average calculating unit 47 finds the average of the absolute differences the calculating units 44 to 46 have calculated. The average value found by the unit 47 is supplied to the FF circuit 48. The FF circuits 48 to 51 supply the average value of the absolute differs for five adjacent pixels, to the average pixel-value calculating unit 52. The unit 52 finds the average value for five adjacent pixels. The average value calculated by the unit 52 is supplied to the double-image detecting unit 53.

The double-image detecting unit 53 compares the average value supplied from the average pixel-value calculating unit 43 with the average value supplied from the average pixel-value calculating unit 52. The average value supplied from the unit 52 may be smaller than that supplied from the unit 43. This means that the correlation between any line and the line following the next is more prominent than the correlation between any two adjacent lines. In this case, the unit 53 determines that two identical image, overlapping each other, have been generated. The unit 53 generates a double-image signal that indicates his decision. The double-image signal is supplied to the output-selecting unit 55 that is incorporated in the pull-down-error detecting unit 28.

The pull-down-error detecting unit 28 has a two-line delaying device 54. The two-line delaying device 54 receives a motion-adaptive interpolated signal from the interpolated-signal generating unit 24 and delays this signal by two-line time. The motion-adaptive interpolated signal thus delayed by two-line time by the two-line delaying device 54, is supplied to the output-selecting unit 55. The unit 55 receives not only the motion-adaptive interpolated signal, but also the double-image signal from the double-image detecting unit 53, a pull-down detection signal from the pull-down detecting unit 25 and a signal C from the line-delaying devices 31. When the unit 55 receives the double-image signal from the double-image detecting unit 53, it replaces the pixels represented by the signal C (intra-field interpolated signal), with the pixels represented by the motion-adaptive interpolated signal and located at the same positions, thereby preventing a double-image error.

A pull-down-error detecting unit 28 that may be provided in the progressive conversion unit 11 of FIG. 7, in place of the circuit shown in FIG. 8, will be described with reference to FIG. 10. As in the detecting unit of FIG. 8, a line-delaying device 60 delays, by one-line time, the intra-field interpolated signal supplied from the double-speed conversion unit 27. The signal thus delayed is further delayed by line-delaying devices 61, 62 and 63, by one-line time in each line-delaying device. Thus, signals A, B, C, D and E are obtained.

Figure 10:
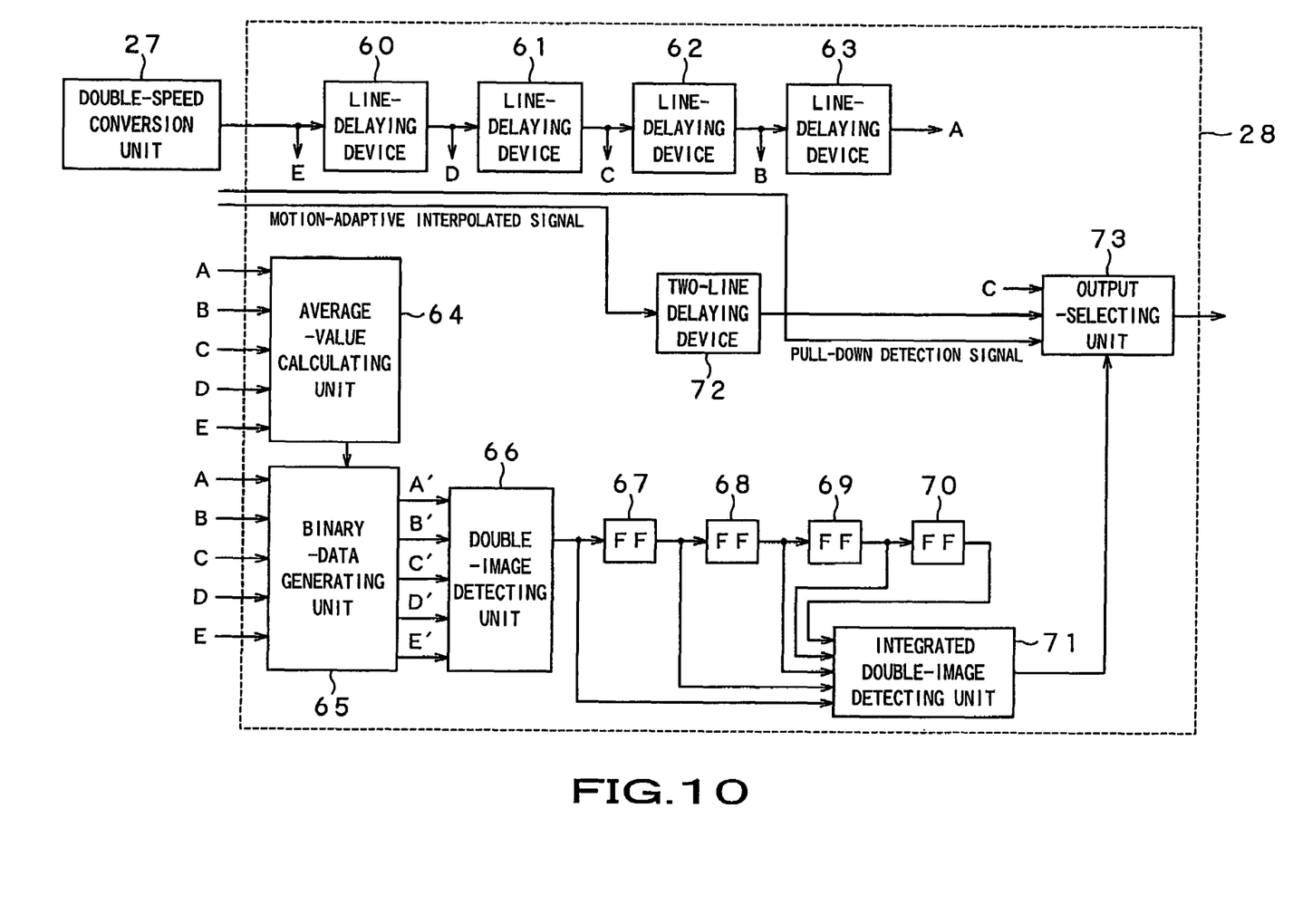
FIG. 10 is a block diagram depicting the internal structure of a pull-down-error detecting unit that may be provided in the progressive conversion unit of FIG. 7.

As FIG. 10 depicts, this pull-down-error detecting 28 comprises an average-value calculating unit 64, a binary-data generating unit 65, a double image detecting unit 66, flip-flop circuits 67 to 70, an integrated double-image detecting unit 71, a two-line delaying device 72, and an output-selecting unit 73. The average-value calculating unit 64 finds the average of the signals A, B, C, D and E. The binary-data generating unit 65 converts the signals A, B, C, D and E to binary signals A', B', C', D' and E', respectively. More precisely, it generates "1" if the pixel data is greater than the average value of the signals A, B, C, D and E, and "0" if the pixel data is smaller than the average value of the signals A, B, C, D and E. The double-image detecting unit 66 determines that a double-image error has occurred, if a binary-value pattern for five lines is identical to a prescribed pattern.

Figure 11:
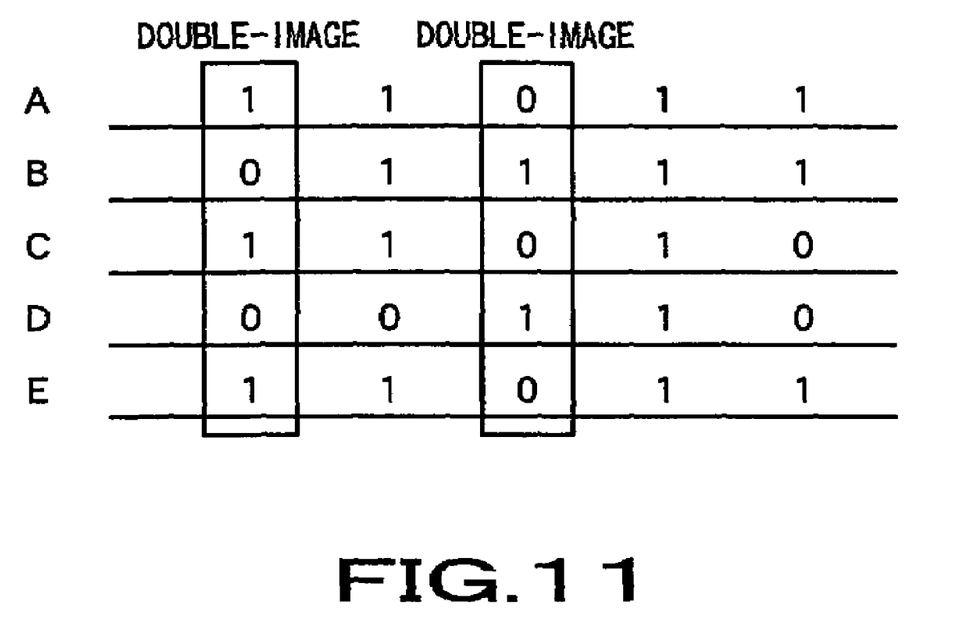
FIG. 11 is a diagram illustrating a binary-value pattern for five lines.

FIG. 11 illustrates a binary-value pattern for five lines. The binary-value pattern may be "1,0,1,0,1" or "0,1,0,1,0" either shown in FIG. 11. This means that the any line and the line following the next are more correlated than any two adjacent lines are correlate. In this case, double-image detecting unit 66 determines that a double-image error has occurred. The unit 66 therefore supplies a signal showing the result of decision, to the flip flop (FF) circuit 67 and to the integrated double-image detecting unit 71, too. The FF circuits 67 to 70 supply four decision-result signals for the adjacent pixels to the integrated double image detecting unit 71. Thus, five decision-result signals for five adjacent pixels are supplied to the integrated double-image detecting unit 71. From the five decision-result signals, the unit 71 determines whether a double-image error has occurred indeed. The integrated double-image detecting unit 71 determines that a double-image error has occurred if, for example, the binary-value pattern of five adjacent pixels is identical to the pattern of the above-mentioned double image.

The motion-adaptive interpolated signal, thus delayed by the two-line delaying device 72 by two-line time, is supplied to the output-selecting unit 73. The unit 73 receives not only the motion-adaptive interpolated signal, but also the double-image signal from the integrated double-image detecting unit 71, a pull-down detection signal from the pull-down detecting unit 25 and a signal C from the line-delaying device 31. When the output-selecting unit 73 receives the double-image signal from the integrated double-image detecting unit 71, it replaces the pixels represented by the signal C (intra-field interpolated signal), with the pixels represented by the motion-adaptive interpolated signal and located at the same positions, thereby preventing a double image error.

As described above, the progressive conversion unit 11 of this embodiment converts the input signal, i.e., interlaced signal generated by the 3-2 or 2-2 pull-down process and containing an ordinary 60-fields/sec signal to a progressive signal. To convert the input signal to a progressive signal, the unit 11 generates an intra-field interpolated signal and a motion-adaptive interpolated signal and determines whether the intra-field interpolated signal has a double-image error in units of pixels. If a double-image error is detected, the intra-field interpolated signal is replaced by the motion-adaptive interpolated signal, for each pixel. Thus, the progressive conversion unit 11 eliminates the double-image error that would greatly degrade the image quality. Hence, the unit 11 can convert both the ordinary 60-fields/sec signal and the remaining part of the input signal into a progressive signal without degrading the image quality.

The present invention is not limited to the embodiment described above. Various changes and modifications can be made, without departing from the scope and spirit of the invention.

The above-described embodiment uses the data about five adjacent scanning lines and the data about five pixels adjacent in the horizontal direction, in order to detect a double-image error. Instead, the data about any other number of adjacent scanning lines and the data about any other number of pixels adjacent in the horizontal direction can be used for the same purpose.

In the embodiment described above, the fame rate is 60 fields per second. Nevertheless, this invention can be applied to signals of any other formats, such as a PAL signal that has the frame rate of 50 fields per second.

Moreover, this invention can be applied not only to signals generated by the 3-2 pull-down process and 2-2 pull-down process, but also to signals the frame rate of which has been changed by arranging the frames of the original image in a specific sequence.

As described above, the intra-field interpolated signal is replaced by the motion-adaptive interpolated signal when the pull-down detecting unit 25 detects a double-image error. Instead, the intra-field interpolated signal may be replaced by any other kind of a signal in the present invention. For example, the intra-field interpolated signal can be replaced by another intra-field interpolated signal.

As has been described, an intra-field interpolated signal or a motion-adaptive interpolated signal can be selected for each pixel in the present invention. This renders it possible to convert an interlaced signal generated by the 3-2 or 2-2 pull-down process and containing, for example, an ordinary 60-fields/sec signal, to a progressive signal, without degrading the image quality. In other words, the invention can convert both the 60-fields/sec signal and the rest of the interpolated signal to a progressive signal, without degrading the image quality.

While the invention has been described with reference to specific embodiment chosen for purpose of illustration, it should be apparent that numerous modifications could be made thereto by those skilled in the art without departing from the basic concept and scope of the invention.

What is claimed is:

1. An image processing apparatus for converting to a progressive signal an interlaced signal containing a signal that has been converted from a different format to an image signal with original-image frames re-arranged in a prescribed sequence and with a standard frame rate, the apparatus being operable whether or not the interlaced signal also contains an unconverted image signal of said standard frame rate and comprising:

signal-generating means for performing intra-field interpolation on a present field to generate a pixel of interest in an interpolated scanning line in a progressive, intra-field interpolated signal from a scanning line in a field that follows the present field in time and is located at the same position as the interpolated scanning line of the present field, or from a scanning line in a field that precedes the present field in time and is located at the same position as the interpolated scanning line of the present field; and double-image detecting means for determining, for each pixel in the interpolated field, whether the pixel of interest in the intra-field interpolated signal, is a pixel included in pixels that constitute a double-image portion of the intra-field interpolated signal by sensing whether a pair of lines spaced closer to each other in the interpolated field exhibit a lower correlation than the correlation exhibited by a pair of lines spaced farther from each other in said interpolated field.

2. The image processing apparatus according to claim 1, wherein the signal contained in the interlaced signal has been converted into an interlaced signal by means of a 3-2 pull-down process or a 2-2 pull-down process.

3. The image processing apparatus according to claim 1, wherein, when the double-image detecting means determines that the pixel of interest constitutes the double-image portion, the intra-field interpolated signal generated by the signal-generating means and corresponding to the pixel of interest is replaced by a predetermined converted signal that corresponds to the pixel of interest.

4. The image processing apparatus according to claim 3, further comprising interpolated-signal generating means for performing intra-field interpolation to generate a progressive, interpolated signal from scanning lines located above and below the interpolated scanning line in the present field, or performing inter-field interpolation to generate the signal from a scanning line that follows the present field in time and is located at the same position as the interpolated scanning line of the present field, and a scanning line preceding the present field in time and is located at the same position as the interpolated scanning line of the present field, wherein, when the double-image detecting means determines that the pixel of interest constitutes the double-image portion, the intra-field interpolated signal corresponding to the pixel of interest is replaced by the interpolated signal that corresponds to the pixel of interest.

5. The image processing apparatus according to claim 4, wherein the interpolated-signal generating means has motion-detecting means for detecting a motion of the present field, performs the intra-field interpolation, thereby generating the interpolated signal, when the motion-detecting means detects the motion of the present field, and performs inter-field interpolation, thereby generating the interpolated signal, when the motion-detecting means detects no motion of the present field.

6. The image processing apparatus according to claim 5, further comprising:

a converted-signal detecting unit for determining whether the image signal is almost identical to the converted signal; and a double-image detecting/replacing unit configured to receive the intra-field interpolated signal generated by the signal-generating means and also the interpolated signal generated by the interpolated-signal generating means and used as the interpolated signal, and to detect the double-image portion of the intra-field interpolated signal and replace the double-image portion by the interpolated signal in accordance with a decision made by the double-image detecting means, when the converted-signal detecting means determines that the image signal is almost identical to the converted signal.

7. The image processing apparatus according to claim 1, wherein the double-image detecting means determines whether the pixel of interest contained in the intra-field interpolated signal constitutes the double-image portion, on the basis of the correlation of predetermined some of the pixels on a straight line that intersects one of adjacent scanning lines, which includes the pixel of interest, the adjacent scanning lines including the scanning line on which the pixel of interest exists.

8. The image processing apparatus according to claim 7, wherein the double-image detecting means determines that the pixel of interest constitutes the double-image portion, when the pixels on any line and the line following the next are more correlated than the pixels on any two adjacent lines are correlated.

9. The image processing apparatus according to claim 7, wherein the double-image detecting means detects how much the pixel of interest and the other pixels on the same scanning line are correlated, thereby to determine whether the pixel of interest constitutes the double-image portion.

10. The image processing apparatus according to claim 1, wherein the double-image detecting means obtains a binary-value pattern of some of the pixels on a straight line that intersects one of adjacent scanning lines, which includes the pixel of interest, the adjacent scanning lines including the scanning line on which the pixel of interest exists, and determines whether the pixel of interest contained in the intra-field interpolated signal constitutes the double-image portion, on the basis of the binary-value pattern.

11. The image processing apparatus according to claim 10, wherein the double-image detecting means converts the pixels existing on a straight line that intersects one of the scanning line on which the pixel of interest exists, each to a binary value in accordance with whether the value of the pixel is greater or smaller than the average value of the pixels existing on the straight line, thereby to obtain the binary-value pattern.

12. The image processing apparatus according to claim 10, wherein the double-image detecting means obtains the binary-value pattern of adjacent pixels on the scanning line, which include the pixel of interest, thereby to determine whether the pixel of interest constitutes the double-image portion.

13. An image processing method of converting to a progressive signal an interlaced signal containing a signal that has been converted from a different format to an image signal that with original-image frames re-arranged in a prescribed sequence and with a standard frame rate, the method being performed whether or not the interlaced signal also contains an unconverted image signal of said standard frame rate and comprising the steps of:

performing intra-field interpolation on a present field to generate a pixel of interest in an interpolated scanning line in a progressive, intra-field interpolated signal from a scanning line in a field that follows the present field in time and is located at the same position as the interpolated scanning line of the present field, or from a scanning line in a field that precedes the present field in time and is located at the same position as the interpolated scanning line of the present field; and determining, for each pixel in the interpolated field, whether the pixel of interest in the intra-field interpolated signal, is a pixel included in pixels that constitute a double-image portion of the intra-field interpolated signal by sensing whether a pair of lines spaced closer to each other in the interpolated field exhibit a lower correlation than the correlation exhibited by a pair of lines spaced farther from each other in said interpolated field.

14. The image processing method according to claim 13, wherein the signal contained in the interlaced signal has been converted into an interlaced signal by means of a 3-2 pull-down process or a 2-2 pull-down process.

15. The image processing method according to claim 13, further comprising a step of replacing the intra-field interpolated signal generated in the step of performing intra-field interpolation and corresponding to the pixel of interest, by a predetermined converted signal corresponding to the pixel of interest, when it is determined that the pixel of interest constitutes the double-image portion.

16. The image processing method according to claim 15, further comprising a step of generating a progressive, interpolated signal by performing intra-field interpolation from scanning lines located above and below the interpolated scanning line in the present field, or by performing inter-field interpolation from a scanning line that follows the present field in time and is located at the same position as the interpolated scanning line of the present field, and a scanning line preceding the present field in time and is located at the same position as the interpolated scanning line of the present field, wherein, when it is determined that the pixel of interest constitutes the double-image portion, the pixel of interest, which is contained in the intra-field interpolated signal, is replaced by the interpolated signal generated in the step of generating an interpolated signal and corresponding to the pixel of interest, in the step of replacing the intra-field interpolated signal.

17. The image processing method according to claim 16, wherein the step of generating an interpolated signal includes a step of detecting a motion of the present field, performs the intra-field interpolation, thereby generating the interpolated signal, when the motion of the present field is detected in the step of detecting a motion, and performs inter-field interpolation, thereby generating the interpolated signal, when no motion of the present field is detected in the step of detecting a motion.

18. The image processing method according to claim 13, wherein, the pixel of interest in the intra-field interpolated signal is determined to be included in pixels that constitute the double-image portion on the basis of the correlation of predetermined some of the pixels on a straight line that intersects one of adjacent scanning lines, which includes the pixel of interest, the adjacent scanning lines including the scanning line on which the pixel of interest exists.

19. The image processing method according to claim 18, wherein the pixel of interest is determined to be included in the double-image portion when the pixels on any line and the line following the next line are more correlated than the pixels on any two adjacent lines are correlated.

20. The image processing method according to claim 18, wherein, the pixel of interest is determined to be included in the double-image portion by detecting how much the pixel of interest and the other pixels on the same scanning line are correlated.

21. The image processing method according to claim 13, wherein the pixel of interest is determined to be included in the double-image portion on the basis of a binary-value pattern of some of the pixels on a straight line that intersects one of adjacent scanning lines, which includes the pixel of interest, the adjacent scanning lines including the scanning line on which the pixel of interest exists.

22. The image processing method according to claim 21, wherein the pixels existing on a straight line that intersects one of the scanning lines on which the pixel of interest exists are converted, each to a binary value in accordance with whether the value of the pixel is greater or smaller than the average value of the pixels existing on the straight line, thereby to obtain the binary-value pattern.

23. The image processing method according to claim 21, wherein, the binary-value pattern of adjacent pixels on the scanning line, which include the pixel of interest, is obtained, thereby to determine whether the pixel of interest is included in the double-image portion.

* * * * *